United States Patent [19]
Roesch et al.

[11] Patent Number: 5,877,236
[45] Date of Patent: Mar. 2, 1999

[54] MICROENCAPSULATABLE SOLVENT ADHESIVE COMPOSITION AND METHOD FOR COUPLING CONDUITS

[75] Inventors: Mark A. Roesch, Brecksville; David A. Maccarone, Hudson; Gary F. Hillenbrand, Springboro; Morris F. Newsom, Xenia; Roland M. Lynch, Centerville, all of Ohio

[73] Assignee: The Lamson & Sessions Co., Cleveland, Ohio

[21] Appl. No.: 8,882

[22] Filed: Jan. 20, 1998

Related U.S. Application Data

[60] Division of Ser. No. 741,191, Oct. 29, 1996, Pat. No. 5,821,293, which is a continuation-in-part of Ser. No. 741,193, Oct. 29, 1996, abandoned.

[60] Provisional application No. 60/009,295 Dec. 8, 1995.

[51] Int. Cl.⁶ .............................. C08K 9/10; B32B 3/26
[52] U.S. Cl. ................. 523/210; 428/321.5; 428/402.21; 524/315; 524/365; 524/366
[58] Field of Search ..................................... 524/365, 366, 524/315; 428/402.21, 321.5; 523/210

[56] References Cited

U.S. PATENT DOCUMENTS

| | | |
|---|---|---|
| 2,988,461 | 6/1961 | Eichel . |
| 3,378,420 | 4/1968 | Dickinson et al. . |
| 3,489,599 | 1/1970 | Kriehle . |
| 3,686,701 | 8/1972 | Charle et al. . |
| 3,811,980 | 5/1974 | Roderhoff . |
| 3,814,156 | 6/1974 | Bachmann et al. . |
| 3,821,060 | 6/1974 | Braca et al. . |
| 3,922,373 | 11/1975 | Bayless . |
| 4,073,946 | 2/1978 | Bayless . |
| 4,107,071 | 8/1978 | Bayless . |
| 4,200,480 | 4/1980 | Wolinski et al. . |
| 4,207,697 | 6/1980 | Murphy . |
| 4,377,621 | 3/1983 | Hart et al. . |
| 4,536,524 | 8/1985 | Hart et al. . |
| 4,672,084 | 6/1987 | Dierdorf et al. . |
| 4,865,938 | 9/1989 | Sakai et al. . |
| 5,297,819 | 3/1994 | Harder . |
| 5,384,345 | 1/1995 | Naton . |
| 5,416,142 | 5/1995 | Bush et al. . |

FOREIGN PATENT DOCUMENTS

| | | |
|---|---|---|
| 2813538 | 10/1979 | Germany . |
| 3512537 | 6/1987 | Germany . |
| 50-098 520 | 8/1975 | Japan . |
| 402292380A | 12/1990 | Japan . |
| 2274461 | 7/1994 | United Kingdom . |
| WO 92/16290 | 10/1992 | WIPO . |

*Primary Examiner*—Andrew E. C. Merriam
*Attorney, Agent, or Firm*—Jones, Day, Reavis & Pogue

[57] ABSTRACT

A microencapsulatable solvent adhesive composition for coupling plastic conduits, such as pipes, connectors and related fittings comprises a water-insoluble polymer and a mixture of volatile organic solvents for the polymer, each of the solvents having 6 to 40 carbon atoms. This solvent adhesive composition is suitable for microencapsulation by aqueous-based microencapsulation processes. A plurality of microcapsules encapsulating the solvent adhesive composition are bound to a polymeric surface of a conduit, such as a pipe connector or fitting, by a binder composition, to form a surface coated with a layer of rupturable microcapsules. When the microcapsules are ruptured upon joining of the coated conduit to a second conduit, the volume of the released solvent adhesive composition is sufficient to cement the surfaces together.

2 Claims, 2 Drawing Sheets

MICROENCAPSULATABLE SOLVENT ADHESIVE COMPOSITION AND METHOD FOR COUPLING CONDUITS

This application is a divisional of U.S. patent application Ser. No. 08/741,191, filed Oct. 29, 1996, now U.S. Pat. No. 5,821,206 which continuation-in-part of U.S. patent application Ser. No. 08/741,193, filed Oct. 29, 1996 (now abandoned) that claims the benefit of U.S. Provisional Application Ser. No. 60/009,295, filed Dec. 8, 1995.

BACKGROUND OF THE INVENTION

Segments of non-metallic conduits, such as pipes, fittings and connectors which are designed to be interfitting, are commonly joined together by inserting an end of one into an end of the other and sealing the junction with an adhesive. For example, segments of polyvinylchloride (PVC), chlorinated polyvinylchloride (CPVC) or acrylonitrile-butadiene-styrene (ABS) pipe may be joined with corresponding connectors or related fittings and the connection sealed with a solvent adhesive.

Solvent adhesives are typically liquid solvents containing a small amount of dissolved polymer resin that is the same polymer, or a chemically similar polymer, that comprises the objects to be joined. When such a solvent adhesive comes in contact with the surfaces of the objects, the solvent partially dissolves and softens the outer layers of the mated surfaces. The resin in the solvent solution fills any holes or spaces between the two surfaces by bonding to the partially dissolved surfaces and entangling the polymer chains. When the solvent evaporates, the polymer solidifies and a mechanical bond is created between the surfaces, forming a "solvent weld".

Conventional solvent adhesives for PVC, CPVC and ABS and other plastics are known in the art and generally are a mixture of solvents selected on the basis of their ability to dissolve high and/or low molecular weight resin and their different evaporation rates. A proper mixture of solvents will completely dissolve the resin in the adhesive and reduce the solution to the desired solids concentration and viscosity for application and workability. Some organic compounds in the solvent adhesive may not be true solvents for the resin, but rather function as plasticizers, softening or swelling polymer surfaces, to provide lubrication for the fitting together of conduits, such as pipe joints, and mobility for achieving proper alignment. In the context of this invention, the term "solvent" is intended to include both solvents and plasticizers for the polymer. Solvent adhesives may contain other additives, such as a colorant to make the adhesive more visible, and inert fillers and other compounds to increase the solids content and/or to control viscosity.

Conventional solvent adhesives may contain one or a mixture of several different organic solvents. For example, solvent adhesives for PVC or CPVC may contain, in addition to PVC or CPVC resin, the solvents tetrahydrofuran (THF) and cyclohexanone or a mixture of THF, methylethylketone (MEK), cyclohexanone and acetone. Similarly, a solvent for ABS in solvent adhesives is typically MEK. Other reported solvents used in solvent adhesives for PVC, ABS or CPVC are ethyl acetate, dimethylformamide and N-methyl-2-pyrrolidone. Because these solvents have different evaporation rates, the quantity of each of the solvents in the mixture determines the open time available for workability, fitting and adjustment. The cure of the solvent weld occurs when most of the applied solvents have evaporated and the solvent welded joints are fused together. Preferably, cure takes place within a reasonable period of time without the use of heat, pressure, UV light or extraordinary mechanical devices.

There are several problems associated with the use of conventional solvent adhesives. For example, the solvent adhesives are liquids and are usually applied in an open environment to plastic surfaces with a brush or other tool immediately prior to the joining of the surfaces. This application can be time-consuming and wasteful, as the liquid adhesive may spread along a greater surface area than actually desired or may drip or spill. In addition, a loss of solvents may occur by evaporation during application. The solvents themselves are flammable and many have a high volatile organic content (VOC), with resulting safety and environmental concerns.

One approach to solving the above problems, disclosed by the present invention, is to provide to the end user a suitable conduit segment, such as a pipe segment, fitting or connector, that is pre-coated with a microencapsulated solvent adhesive in a dry form. The user then simply couples the supplied conduit segment to a complementary interfitting conduit segment and, by applying ordinary mechanical force, ruptures the microcapsules to release the solvent adhesive and cement the segments together. Thus, the previous problems of unwanted waste, expense, and issues of safety and the environment are materially reduced.

It has been suggested previously that a conventional solvent adhesive, such as those described above, may be microencapsulated and coated onto a surface of a pipe. However, no disclosure of a conventional solvent adhesive that is microencapsulatable has been forthcoming. Microencapsulation of separate components of certain adhesive components has been reported. For example, pipe sections, such as polyester fiberglass or epoxy fiberglass may be joined by an adhesive composition formed by a polymerization reaction that occurs as the pipes are joined. In this system, a polymerization activator may be encapsulated in a rupturable microsphere and dispersed in a solution containing polymerizable monomers and a polymerization catalyst. The microspheres are ruptured either before or after the adhesive is applied to the pipe, releasing the activator to initiate the polymerization reaction. It is also known that common epoxy adhesives may be formed in a two-part system by separately microencapsulating the epoxy resin and the curing agent and rupturing the microcapsules to mix the two components. Solvents for use in cosmetic compositions may also be separately microencapsulated and a mixture of these capsules introduced, for example, into a suitable cosmetic vehicle before rupture of the capsules to mix the solvents. Each of the above-described systems, however, involves separate encapsulation of individual system components.

Thus, there is a need for a microencapsulatable solvent adhesive composition for plastic conduits, such as those manufactured from PVC, CPVC, ABS, or mixtures of these, that contains polymer resin and a mixture of appropriate solvents. Preferably, the solvents in the composition are aggressive in dissolving or softening the polymer in order to provide sufficient lubrication to facilitate the insertion of a conduit segment into the mating conduit segment, such as in an interference fit, as well as to improve the open time for workability and adjustment. There is a further need for microcapsules that contain a sufficient volume of a solvent adhesive composition to enhance lubrication and to cement the mated surfaces together with a desired bond strength.

SUMMARY OF THE INVENTION

The present invention solves the aforementioned problems by providing a microencapsulatable solvent adhesive composition for joining plastic pipes, fittings or connectors. The solvent adhesive composition of the invention is microencapsulatable by aqueous-based microencapsulation processes, and comprises 3 to 20 parts by weight of a water-insoluble polymer, and 80 to 97 parts by weight of a mixture of volatile organic solvents for the polymer, each of the solvents comprising 6 to 40 carbon atoms. The solvents are preferably selected from the group consisting of aromatic hydrocarbons, cyclic ethers, esters, lactones, linear ketones, branched ketones, cyclic ketones, alkyl-substituted cyclic ketones, and mixtures of these. In order to be microencapsulatable, the mixture preferably has a solubility in water of less than two percent, more preferably less than one and a half percent.

The solvent adhesive composition may comprise, in addition to the first polymer, 3 to 20 parts by weight of a second water-insoluble polymer which may be a copolymer of the first polymer. The polymer in the solvent adhesive composition may be any water-insoluble polymer that is solubilized or plasticized by the solvents of the invention. In an embodiment of the invention, a solvent adhesive composition for joining PVC or CPVC conduits comprises PVC or CPVC resin and a mixture of solvents selected from toluene, butyl butyrate, cyclohexanone, 2-octanone, 2-methyltetrahydropyran, 3-methyltetrahydropyran and 4-methyltetrahydropyran. A preferred microencapsulatable solvent adhesive of the invention for PVC or CPVC conduits comprises a mixture of 3 to 10 parts by weight PVC resin, 3 to 10 parts by weight PVC-vinyl acetate copolymer resin, 0 to 50 parts by weight 2-octanone, 0 to 35 parts by weight 3-methyltetrahydropyran, 20 to 60 parts by weight butyl butyrate and 20 to 60 parts by weight toluene. In another embodiment, the solvent adhesive of the invention for PVC or CPVC conduits comprises 4 to 20 parts by weight of PVC resin, 8 to 40 parts by weight cyclohexanone and 40 to 88 parts by weight toluene.

The invention provides a plurality of microcapsules comprising an encapsulated volume of the solvent adhesive composition of the invention. The microcapsules comprise an average diameter of 100 to 1000 microns, preferably 250 to 600 microns, and the weight of the encapsulated volume of the solvent adhesive comprises 50 to 90 percent, preferably 70 to 85 percent, especially 80 percent of the weight of the microcapsules. Thus, the microcapsules provide a sufficient volume of the solvent adhesive to enhance lubrication and to cement the mated surfaces together with a desired bond strength.

The invention provides a binder composition suitable for binding the plurality of microcapsules to a polymeric wall surface, such as that of a pipe, coupling or related fitting. The binder composition comprises the polymer of the wall surface, or a chemically related polymer, and a volatile organic compound that is a solvent for the polymer. The binder composition is non-reactive with the microcapsule walls and does not extract the solvents of the encapsulated solvent adhesive from the microcapsules.

The invention also provides a polymeric wall surface at least partially coated with the plurality of microcapsules encapsulating the solvent adhesive composition, bound to the surface by the binder composition of the invention. In an embodiment of the invention, the microcapsule-coated polymeric wall surface comprises a segment of a conduit, such as a pipe, coupling or related fitting. When the microcapsules are ruptured by coupling of the treated conduit with an interfitting second conduit wall segment surface, such as in an interference fit, a sufficient volume of the solvent adhesive is released by the plurality of microcapsules to cement the surfaces together.

DETAILED DESCRIPTION OF THE INVENTION

Figure 1:
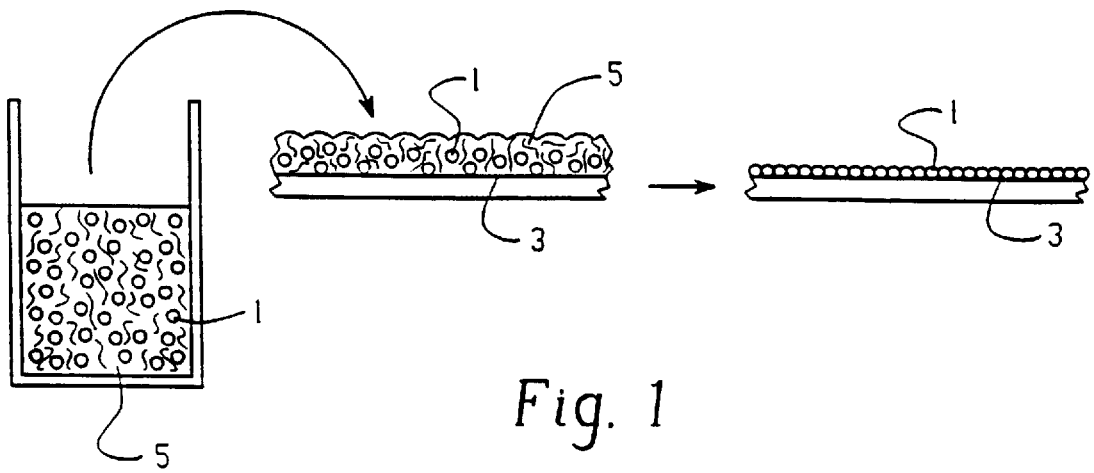
FIG. 1 is a schematic illustration of a method of coating a polymeric wall surface of a conduit, such as a pipe, connector or fitting, with a dispersion of a plurality of microcapsules comprising the solvent adhesive of the composition in a binder composition.

The present invention concerns a novel formulation for a solvent adhesive composition that is microencapsulatable by known aqueous-based microencapsulation processes. The solvent adhesive composition comprises a water-insoluble polymer and a mixture of volatile organic solvents for the polymer, and has a high solids content to provide improved lubrication. The solvent adhesive composition may be employed to cement together any type of plastic conduit including, but not limited to electrical, water, drain, waste, vent and sewer pipes, and appropriate connectors and fittings for these. The conduits may be manufactured of PVC, CPVC, ABS, polyacrylates, polystyrene, polycarbonates, or any homopolymer or copolymer there of that is soluble in an organic solvent that comprises 6 to 40 carbon atoms, as described below. Preferably, the plastic conduits comprise PVC, CPVC, ABS, or mixtures of these, as these are widely used for conduits.

Although it has been previously suggested that conventional solvent adhesive compositions, such as those widely used for joining PVC, CPVC and ABS pipes, can be microencapsulated, it has been herein discovered that these conventional solvent adhesive mixtures are not encapsulatable by either known aqueous or known organic microencapsulation processes. It was therefore necessary to identify a combination of solvents and resins that can be microencapsulated and that have the properties, described above, that are necessary for effective coupling and cementing of the plastic conduit segments. Thus, the invention does not employ solvents commonly used in solvent adhesives, such as THF, MEK, acetone, dimethylformamide, ethyl acetate and N-methyl-2-pyrrolidone, as these have been found to be not encapsulatable by known microencapsulation processes because of their dual solubility, i.e. they are soluble, to varying degrees, in both organics and water. In contrast, the mixture of volatile organic solvents in the solvent adhesive composition of the present invention has a solubility in water of less than two percent, preferably less than one and a half percent, and thus is microencapsulatable by an aqueous-based microencapsulation process.

The solvents employed in the mixture of solvents of the invention composition are, in one aspect, selected for their ability to dissolve the resin in the solvent adhesive and their ability to dissolve or to be dissolved in the polymer surfaces to be joined. Thus, the more "aggressive" a solvent is, the more polymer resin that solvent is capable of dissolving and the more quickly that solvent is capable of dissolving or softening (i.e. plasticizing) the polymer surface layer when applied to a conduit. For example, 2-octanone, 3-methyltetrahydropyran and butyl butyrate are considered to be "aggressive" solvents for PVC and CPVC. As discussed below, each of these properties is important in providing lubrication for coupling and adjusting mating conduit surfaces.

Lubrication is enhanced by solids, such as polymer resin and inorganic fillers, such as fumed silica, in the solvent adhesive mixture. The resins and/or added fillers improve viscosity and provide a somewhat gelatinous texture to the solvent adhesive. Therefore, in one aspect, for enhanced lubrication properties, it is preferable that the solvent adhesive composition have as high as possible a solids content. In addition, the solvent adhesive composition of the invention may contain other fillers and/or colorants, known in the art.

A high resin content in the solvent adhesive composition also enables development of a strong polymer bond in the solvent weld. Accordingly, the solvents of the solvent adhesive composition are selected, in part, based on their differential ability to dissolve high, medium or low molecular weight resins, or blends of these. For example, toluene is an effective solvent for low molecular weight, but not high molecular weight, PVC and CPVC resins; whereas butyl butyrate, cyclohexanone, 2-octanone and certain ethers, such as 2-, 3-, or 4-methyltetrahydropyran, are effective solvents for both high and low molecular weight PVC and CPVC resins. Preferably, in the solvent mixture, the proportion of solvents that have the ability to dissolve high, medium and low molecular weight resins is optimized to obtain maximum incorporation of dissolved resin into the adhesive to achieve a desired pull and bend strength, as discussed below. The solids content of the solvent adhesive may be further increased by the addition to the mixture of a copolymer resin, as random copolymers are generally more soluble in solvents than homopolymers.

The polymer resin(s) dissolved in the solvent to form the solvent adhesive composition of the invention may be freshly prepared polymer or, in some instances, may be polymer regrind. Generally, the polymer or polymers in the solvent adhesive are identical or at least chemically similar to the polymer surface(s) to be cemented.

The solvents of the solvent adhesive are selected, in another aspect, based on their differential evaporation rate. As discussed above, the higher the evaporation rate, the shorter is the open time for workability; the lower the evaporation rate, the longer is the open time. An advantage of microencapsulating a solvent adhesive composition is that the open time does not begin until the microcapsules are ruptured by coupling together conduit segments and the solvent adhesive is released. The solvent adhesive composition of the invention preferably dries to the touch in about 3–5 minutes and cures in ambient conditions within a reasonable period of time without the use of heat, pressure, UV light or extraordinary mechanical devices.

The process of microencapsulation is well known in the art and is not itself part of the present invention. Typical of microencapsulation techniques which may be used in the present invention are described in U.S. Pat. Nos. 3,922,373; 4,073,946; 4,107,071; 4,377,621; and 4,536,524, the disclosures of which are hereby incorporated by reference. Briefly, the solvent adhesive composition of the present invention is hydrophobic, having a water solubility of less than two percent, and thus may be microencapsulated by a process in which the liquid solvent adhesive composition is dispersed in an agitated aqueous solution containing a dissolved cross-linkable polymeric material. The hydrophobic solvent composition forms a plurality of discrete liquid capsule core material entities in the aqueous solution. The size of the discrete capsule core material entities depends on the desired size of the end-use microcapsules and is controllable by varying process conditions, such as the temperature, the viscosity of the core material, and the intensity of agitation in the system. A phase separation inducing material, which is also soluble in the aqueous solution, decreases the affinity of the polymeric base material for the water and increases its affinity for the hydrophobic capsule core material. Thus, the polymeric base material is induced to leave the aqueous phase and form a film around the hydrophobic capsule core material. The polymeric film is subsequently cross-linked by known cross-linking agents, to form a capsule wall around the core material. Excess entrapped aqueous solvent is then extracted from the resulting microcapsules, which are subsequently dried and are ready for use.

The appropriate reagents, solvents and process conditions to accomplish microencapsulation of the solvent adhesive composition of the present invention are known in the art. Suitable cross-linkable polymeric base materials that form the microcapsule wall that encapsulates the solvent adhesive composition of the invention particularly include, but are not limited to, one or more of the following: aminoplasts, gelatin., ethyl cellulose, formaldehyde, glutaraldehyde, gum arabic, melamine, polyvinyl alcohol, resorcinol and urea. Suitable phase separation-inducing materials for use with these crosslinkable polymeric base materials vary according to the material employed, and are known to those skilled in the art.

The solvent adhesive composition of the invention that is suitable for aqueous-based microencapsulation, comprises: (a) 3 to 20 parts by weight of a water-insoluble polymer; and (b) 80 to 97 parts by weight of a mixture of volatile organic solvents for the polymer of (a), each of the solvents comprising 6 to 40 carbon atoms. The solvents are preferably selected from the group consisting of aromatic hydrocarbons, cyclic ethers, esters, lactones, linear ketones, branched ketones, cyclic ketones and alkyl-substituted cyclic ketones. In order to be microencapsulatable, the mixture of solvents preferably has a solubility in water of less than two percent, i.e. it is not necessary that each of the individual solvents has a water solubility of less than two percent, but only that the mixture of solvents has this property. Preferably, the mixture has a solubility in water of less than one and a half percent. As a measure of volatility, each of the solvents in the mixture preferably has a boiling point that approximates or is greater than the boiling point of water. Solvents with boiling points lower than that of water have high volatility and are generally small, light-weight molecules that evaporate too quickly to be encapsulated and/or cannot be retained by a normally porous polymeric capsule wall.

The polymer in the solvent adhesive composition may be any water-insoluble polymer that is solubilized or plasticized by the solvents of the invention, as described above, but is preferably selected from the group consisting of polyvinylchloride, chlorinated polyvinylchloride, acrylonitrile-butadiene-styrene copolymer, and mixtures of these which may be formed, for example, by co-extrusion of the individual polymers. The polymer may include, but is not limited to, high molecular weight homopolymeric PVC and CPVC, low molecular weight homopolymeric PVC and CPVC, and mixtures and copolymers of these. In an embodiment of the invention, the solvent adhesive composition comprises ABS resin having a minimum butadiene content of 6%, a minimum acrylonitrile content of 15% and a minimum styrene or substituted styrene content of 15%. Preferably, the ABS resin comprises 6–15% butadiene, 25–45% acrylonitrile and 40–60% styrene or substituted styrene. More preferably the ABS comprises 35–37% acrylonitrile, 7–10% butadiene and 53–58% styrene.

As discussed above, in order to increase the solids content of the solvent adhesive, 3 to 20 parts by weight of one or more additional water-insoluble polymers or water-insoluble copolymers of the polymer of (a) may be included in the solvent adhesive composition. For example, an embodiment of the invention solvent adhesive composition for PVC conduit may comprise 3 to 10 parts by weight of homopolymeric PVC resin and 3 to 10 parts of weight of a vinyl chloride copolymer resin. Copolymers of vinyl chloride are known in the art and include, for example, copolymers of vinyl chloride with one or more copolymerizable monomers having at least one terminal $CH_2=C$ group, such as other vinyl halides and vinylidene halides; esters of acrylic acid, such as methyl acrylate, ethyl acrylate, etc.; esters of methacrylic acid; nitriles, such as acrylonitrile, methacrylonitrile, etc.; acrylamides, such as methyl acrylamide, etc.; vinyl ethers, such as ethyl vinyl ether; vinyl ketones; vinyl acetate; vinyl pyridine, etc. Copolymers of vinyl chloride may contain up to 50%, preferably up to 20% of the copolymerizable monomers.

The CPVC useful in the compositions of this invention includes chlorinated polyvinylchloride homopolymers and copolymers. CPVC resins useful in this invention may be prepared by chlorination of any of the polyvinylchloride homopolymers or copolymers discussed above by procedures known to those skilled in the art. Commercially available CPVC resins may contain 57% to about 75% by weight of chlorine.

In one embodiment of the invention, a solvent adhesive composition suitable for microencapsulation and for cementing together PVC and/or CPVC conduits comprises PVC and/or CPVC resin and a mixture of solvents selected from toluene, butyl butyrate, 2-methyltetrahydropyran, 3-methyltetrahydropyran, 4-methyltetrahydropyran, 2-octanone and cyclohexanone.

A preferred microencapsulatable solvent adhesive of the invention for PVC and/or CPVC conduits comprises a mixture of 3 to 10 parts by weight PVC resin, 3 to 10 parts by weight PVC-vinyl acetate copolymer resin, 0 to 50 parts by weight 2-octanone, 0 to 35 parts by weight 3-methyltetrahydropyran, 20 to 60 parts by weight butyl butyrate and 20 to 60 parts by weight toluene. More preferably, the composition comprises 4 to 8 parts PVC, 4 to 8 parts PVC-vinyl acetate copolymer resin, 0 to 30 parts 2-octanone, 0 to 32 parts 3-methyltetrahydropyran, 25 to 50 parts butyl butyrate and 25 to 50 parts toluene. Still more preferably, the composition comprises 5 parts by weight PVC resin, 5 parts by weight PVC-vinyl acetate copolymer resin, 30 parts by weight 3-methyltetrahydropyran, 30 parts by weight butyl butyrate and 30 parts by weight toluene.

In another embodiment, the solvent adhesive composition of the invention for PVC and/or CPVC conduits comprises 4 to 20 parts by weight of PVC or CPVC resin, 8 to 40 parts by weight cyclohexanone and 40 to 88 parts by weight toluene. Preferably, the composition comprises 4 to 10 parts by weight PVC or CPVC resin, 8 to 30 parts by weight cyclohexanone and 60 to 88 parts by weight toluene. More preferably, the composition comprises about 5 parts by weight of PVC or CPVC resin, about 10 parts by weight cyclohexanone, about 83 parts by weight toluene.

A plurality of microcapsules encapsulate a volume of the solvent adhesive composition of the invention. Preferably, the plurality of microcapsules comprise an average diameter of 100 to 1000 microns, especially 250 to 600 microns, and the weight of the volume of the encapsulated solvent adhesive comprises 50 to 90 percent, preferably 70 to 85 percent, and more preferably 80 percent of the weight of the microcapsules. The diameter and volume of the microcapsules are controllable by controlling the microencapsulation process parameters, as described above. The average diameter of the plurality of microcapsules is determined mechanically by differential sieving, as known in the art. The weight of the volume of the encapsulated composition is determined by extracting the volume of the composition from the microcapsules. Extraction is generally accomplished by heating the microcapsules in a solvent that is not encapsulatable, such as MEK, THF or acetone, for a period of time sufficient to accomplish the extraction, typically three to four days or more. After extraction, the residue, consisting of the capsule walls, is dried and weighed. The difference between the weight of the microcapsules before extraction and the weight of the microcapsule walls after extraction is the calculated weight of the original volume of the solvent adhesive composition.

The plurality of microcapsules may comprise a heterogeneous mixture of non-interreactive microcapsules, such as microcapsules separately encapsulating solvents or mixtures of solvents, and/or other compositions. For example, the mixture may include microcapsules encapsulating individual solvents of the invention, such as toluene and the like, to provide additional lubrication. Additionally, the plurality of microcapsules may be mechanically mixed with an additional lubricating compound, such as fumed silica or powdered graphite, usually prior to application to a polymeric surface, as described below. A colorant may be added to the microcapsule walls by known means, either during the encapsulation process, or when applying the microcapsules to the polymeric surface.

The plurality of microcapsules encapsulating the solvent adhesive are applied to a defined area on the polymeric wall surface, such as that of a conduit, coupling or related fitting, by a binder composition that is preferably a liquid and comprises the polymer resin and 50 to 95 parts by weight of a volatile organic compound that is a solvent for the polymer. The binder is preferably a composition that is non-reactive with the microcapsule walls and, under the application conditions, does not extract the encapsulated solvents from the microcapsules. Therefore, the binder may comprise any of the solvents or solvent adhesive compositions of the present invention, alternatively or in combination with any conventional solvent adhesive, even those containing solvents with dual solubility, such as THF, MEK, or acetone. The solvent adhesive composition in the binder may also be diluted with any solvent that is non-reactive with the microcapsules. For example, a suitable binder composition for binding microcapsules to a PVC or CPVC surface is a 50:50 mixture by weight of cyclohexanone and a conventional solvent adhesive, such as Oatey Low VOC Cement manufactured by Oatey Company, Cleveland, Ohio, which comprises 10–20% PVC resin, 60–70% THF, 1–5% acetone, 5–15% MEK, 1–10% cyclohexanone, 2-3% fumed silica, less than 1% colorant and 5–15% filler. Such a conventional solvent adhesive may contain additives, such as fillers and colorants, if they are non-reactive with the microcapsules.

Figure 2:
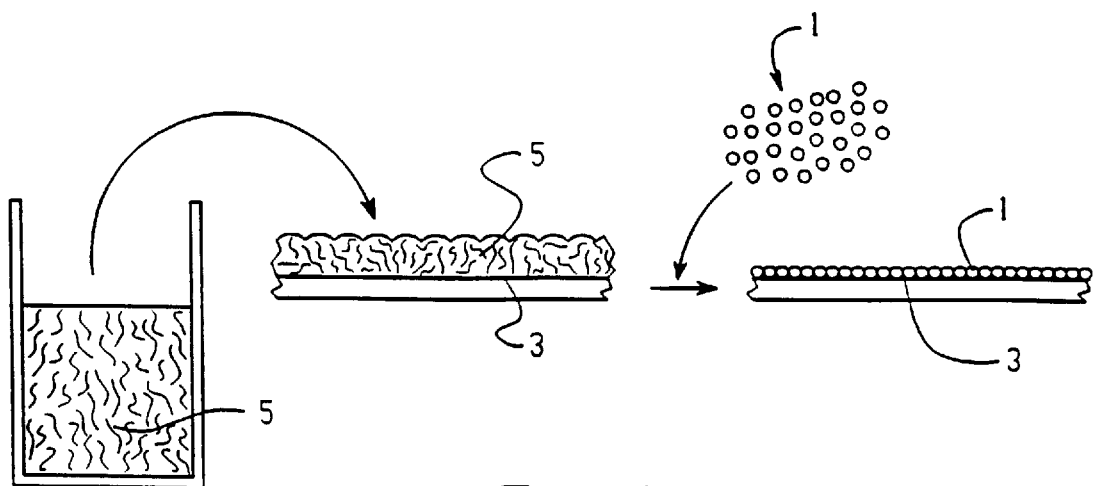
FIG. 2 is a schematic illustration of a method of coating a polymeric wall surface of a conduit, such as a pipe, connector or fitting with a binder composition, followed by the application of a plurality of microcapsules comprising the solvent adhesive of the composition.

The plurality of microcapsules may be applied to the wall surface by any suitable method which will insure that a sufficient quantity of the microcapsules is bound to the surface to provide a volume of solvent adhesive sufficient to cement the coated surface with a second surface when the two surfaces are mated. A binder, such as that described above, facilitates the binding of the microcapsules by partially solubilizing the polymer of the wall surface. As illustrated in FIG. 1, the microcapsules 1 comprising the solvent adhesive composition may be dispersed in the binder composition 5, forming a slurry. Thus, the microcapsules may be applied to the polymeric surface of the wall of a conduit 3 simultaneously with the binder 5; however, preferably, as illustrated in FIG. 2 the binder 5 is applied first, to plasticize the polymeric wall surface of the conduit 3 and make it tacky, and the microcapsules 1 are then applied to the surface, by sprinkling or other means. Curing of the solvent adhesive of the binder provides firm adherence of the microcapsules to the polymer to form a surface layer of rupturable microcapsules.

Thus, the method of the invention includes a method of applying microcapsules to a polymer wall surface, comprising the steps of: (a) providing a plurality of microcapsules encapsulating a volume of a solvent adhesive that comprises 3 to 20 parts by weight of a water-insoluble polymer and 80 to 97 parts by weight of a mixture of volatile organic solvents for the polymer, each of said solvents comprising 6 to 40 carbon atoms; (b) providing a polymeric wall surface comprising the water-insoluble polymer of (a); (c) coating a portion of the wall surface with a binder composition comprising the waterinsoluble polymer of (a) and 50 to 95 parts by weight of a volatile organic compound that is solvent for the polymer; and (d) applying the plurality of microcapsules to the portion of the wall surface. The plurality of microcapsules may first be dispersed in the binder composition and the coating of the wall surface and the applying of the plurality of microcapsules may be accomplished in one step. Preferably, the method further comprises the step of curing the binder composition, whereby the plurality of microcapsules forms a surface layer on the wall surface.

Prior to the application of the binder and microcapsules to a first surface, or later mating of a coated first surface to an uncoated second surface, one or both surfaces may be roughened, for example, with the use of sand paper, to provide greater surface area for the microcapsule coating or the volume of solvent adhesive to adhere to, and to increase the strength of the adhesive bond. Preferably, however, roughening of the surfaces is not performed. The overall intent is to provide a solvent adhesive which will join two substrates through adhesion and not simple mechanical interference.

When a dispersion of microcapsules in the binder is employed (FIG. 1), preferably the dispersion is of a consistency that, when applied to the wall surface, there is a minimum of loss due to dripping or running. Preferably, such a dispersion is controllably painted or sprayed onto a defined portion of the surface. The ratio of the microcapsules and solvents in a dispersion depends, in part, upon the desired thickness and/or weight of the coating on the surface, the binder employed, and the nature of the surfaces to be joined. In an embodiment of the invention, wherein the dispersion is applied to a PVC conduit surface, the dispersion comprises a plurality of microcapsules, a low-VOC PVC cement, and a suitable solvent in a 2:1:1 ratio by weight.

Figure 3:
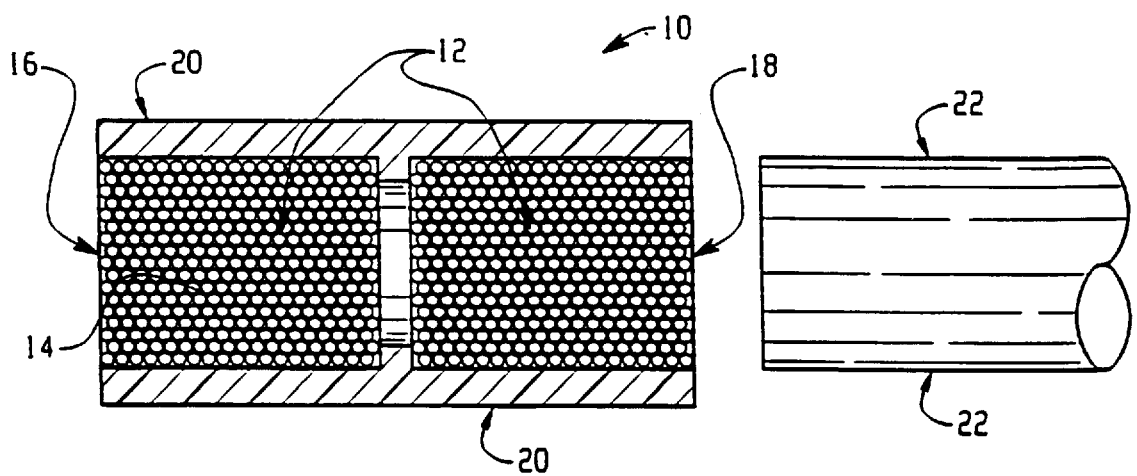
FIG. 3 is a schematic cross-sectional view of a wall segment of a polymeric conduit, such as a pipe, connector or fitting, the inner surface of which is coated with the microcapsules comprising the solvent adhesive composition of the invention before coupling with a second, interfitting conduit.

The microcapsules may be applied to any plastic conduit surface, but the microcapsule coating is particularly useful when joining interfitting wall segments of plastic pipe, pipe connectors or related fittings, such as in an interference fit. The microcapsules may be applied to a defined area on only one or on both mating surfaces, but preferably is applied to one mating surface only, such as the inner surface of a bell pipe segment (for pipes having opposing bell and spigot ends) or the outer surface of a spigot pipe segment. As illustrated in FIG. 3, when applied to a connector or fitting 10, the microcapsules 12 are shown as pre-coated on the inner surface 14, rather than the outer surface 20, of one or both ends 16, 18 of the connector or fitting 10 for later joining with the outer surface of a pipe or other conduit 22. The binder/microcapsule mixture is allowed to cure, resulting in evaporation of the binder solvents and leaving a dry surface layer of microcapsules firmly adhered to the polymer of the wall segment.

The thickness of the microcapsule layer on the conduit wall surface is sufficient to provide a sufficient volume of encapsulated solvent adhesive to result in a strong bond between the first and second mating surfaces upon rupture of the microcapsules and exposure of the surfaces to the solvent adhesive. Generally, the microcapsules form at least a monolayer on the surface. Thus the thickness of the layer may be determined by the average diameter of the microcapsules. The dimensions of the surface area to be coated by the layer of microcapsules are dependent on the relative internal or external diameter of the conduit, pipe, connector or fittings to be joined. In general, the surface area to be coated comprises a band of a predetermined width around the inner or outer circumference of the conduit.

Figure 4:
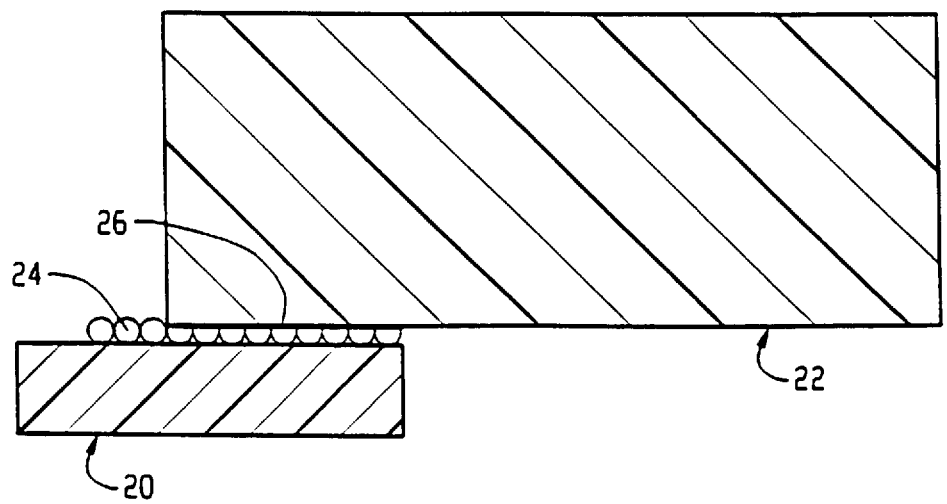
FIG. 4 is a schematic cross-sectional view of the coated wall surface of the polymeric pipe, connector or fitting of FIG. 3 being coupled with a second, interfitting conduit surface whereby the force of the coupling the conduits together ruptures the microcapsules, releasing the solvent adhesive composition.

The treated conduit (including the microencapsulated solvent adhesive) can be packaged, shipped or stored as such for up to the pre-determined shelf-life of the microencapsulated product. As illustrated in FIG. 4, when the microcapsule-coated polymeric conduit wall segment 20 is later joined with an interfitting mating conduit segment 22, such as in an interference fit, the microcapsules 24 on the treated segment 20 rupture, release the volume of the solvent adhesive 26, and cement the conduit segments 20, 22 together, in the same way as conventional solvent adhesives.

The invention thus provides a polymeric wall segment of a conduit, coupling or fitting, the wall segment having a surface and a plurality of microcapsules bound to the surface to form a coated surface, the microcapsules encapsulating a volume of a solvent adhesive composition that comprises 3 to 20 parts by weight of the polymer and 80 to 97 parts by weight of a mixture of volatile organic solvents for the polymer, each of the solvents comprising 6 to 40 carbon atoms. Preferably the mixture of solvents has a solubility in water of less than two percent, more preferably less than one and a half percent, and the solvents are selected from the group consisting of aromatic hydrocarbons, cyclic ethers, esters, lactones, linear ketones, branched ketones, cyclic ketones and alkyl-substituted cyclic ketones. Preferably, the polymer is selected from polyvinylchloride, chlorinatedpolyvinylchloride, acrylonitrile-butadiene-styrene polymer, and mixtures of these.

A second conduit wall segment comprising the same or a chemically similar polymer surface as the treated conduit wall segment, and chemically reactive with the solvent adhesive composition, is interfitted with the coated surface of the treated wall segment, such as in an interference fit, the second wall segment being coupled with the first wall segment with a force sufficient to rupture the plurality of microcapsules on the coated surface and to release substantially the volume of the solvent adhesive composition, wherein the released volume is sufficient to cement the surfaces together.

Thus, the method of the invention for cementing interfitting segments of polymeric conduits, connectors or fittings to each other, comprises the steps of: (a) providing a first polymeric wall segment surface comprising a polymer selected from the group consisting of PVC, CPVC, ABS, and mixtures of these; (b) applying a binder composition to a portion of the first surface, the binder composition comprising the polymer of (a) and 50 to 95 parts by weight of a volatile organic liquid that is a solvent for the polymer; (c) applying a plurality of microcapsules to the portion of the first surface to form a coated surface, wherein the plurality of microcapsules encapsulate a volume of a solvent adhesive composition that comprises 3 to 20 parts by weight of a water-insoluble polymer and 80 to 97 parts by weight of a mixture of volatile organic solvents for the polymer of (a), each of said solvents comprising 6 to 40 carbon atoms; (d) providing a second polymeric wall segment having a surface comprising a polymer that is chemically reactive with the solvent adhesive composition, the surface interfitting with the coated surface of the first wall segment; (e) coupling the second wall segment to the first wall segment with a force sufficient to rupture the plurality of microcapsules on the coated surface and to release substantially the volume of the solvent adhesive composition, wherein the released volume is sufficient to cement the surfaces together; and (f) curing the solvent adhesive composition to substantially cement together the first and second conduit wall segments.

The utility of the solvent adhesive compositions of the present invention is demonstrated by testing the strength of the polymer bond formed by the solvent weld between the two mating surfaces. For example, for electrical conduit, the strength of the bond is measured by "pull strength" or tensile strength, which is a measurement of the force necessary to separate two substrates which have been adhesively joined; and a "bend test", which is a test of the ability of the bond to resist torque or bending stresses. The integrity of the bond is also tested by a liquid "leak test". For electrical pipe, the standards for the pull test, the bend test and the leak test are set by Underwriters Laboratories (UL) Standard 514B. For example, UL requires that a bond between connected PVC pipes of ½ inch diameter must be capable of withstanding a pull strength of 300 lbs. for one minute. Similarly, bonded PVC pipes of ¾ inch diameter must withstand a pull strength of at least 450 lbs. for one minute. In the bend test, the bonds must withstand a gravitational weight of 20 lbs. for ½" bonded pipes and 35 lbs. for ¾" bonded pipes, with rotation through 360° in one minute, without cracking. The bonds must be demonstrated to be leak-proof upon immersion in or spraying on of a liquid, such as water or kerosene, for a given period of time. For water pipes, the strength and integrity of the polymer bond must meet applicable standards established by the American Society for Testing Materials.

Typical of invention solvent adhesive compositions that are suitable for microencapsulation by aqueous-based microencapsulation processes are illustrated by the following examples. Although the examples illustrate solvent adhesive compositions for PVC conduits, CPVC homopolymer and copolymer resins, described above, may be substituted in these examples for PVC homopolymer and PVC copolymer resins without departing from the scope of the invention.

|  | Parts by Weight |
|---|---|
| Example 1 | |
| Toluene | 45 |
| Butyl butyrate | 45 |
| 3-Methyltetrahydropyran | 0 |
| 2-Octanone | 0 |
| PVC resin | 5 |
| Poly(vinylchloride-vinyl acetate copolymer) Vinyl Acetate content 10% | 5 |
| Example 2 | |
| Toluene | 30 |
| Butyl butyrate | 30 |
| 3-Methyltetrahydropyran | 30 |
| 2-Octanone | 0 |
| PVC resin | 5 |
| Poly(vinylchloride-vinyl acetate copolymer) Vinyl Acetate content 10% | 5 |
| Example 3 | |
| Toluene | 45 |
| Butyl butyrate | 0 |
| 3-Methyltetrahydropyran | 0 |
| 2-Octanone | 45 |
| PVC resin | 5 |
| Poly(vinylchloride-vinyl acetate copolymer) Vinyl Acetate content 10% | 5 |
| Example 4 | |
| Toluene | 29 |
| Butyl butyrate | 29 |
| 3-Methyltetrahydropyran | 28 |
| 2-Octanone | 0 |
| PVC resin | 7 |
| Poly(vinylchloride-vinyl acetate copolymer) Vinyl Acetate content 10% | 7 |
| Example 5 | |
| Toluene | 83.33 |
| Cyclohexanone | 9.80 |
| PVC resin | 4.90 |
| Fumed Silica | 1.96 |

While the invention has been described herein with reference to the preferred embodiments, it is to be understood that it is not intended to limit the invention to the specific forms disclosed. On the contrary, it is understood to cover all modifications and alternative forms falling within the spirit and scope of the invention.

We claim:

1. A method of applying microcapsules to a polymeric wall surface, comprising the steps of:

(a) providing a plurality of microcapsules encapsulating a volume of a solvent adhesive that comprises (i) 3 to 20 parts by weight of a water-insoluble polymer that is the same as or is derived from that of the polymeric wall surface, and is selected from the group consisting essentially of polyvinylchloride, chlorinated polyvinylchloride, acrylonitrile-butadiene-styrene, polyacrylates, polystyrene, polycarbonates, and homopolymers and copolymers thereof, and (ii) 80 to 97 parts by weight of a mixture of volatile organic solvents, each of said solvents comprising 6 to 40 carbon atoms, and wherein each of said solvents in the mixture of solvents is a solvent for the water-insoluble polymer defined in (i);

(b) providing a polymeric wall surface comprising a polymer that is the same as or is derived from the water-insoluble polymer of (a);

(c) coating a portion of the wall surface with a binder composition that comprises a polymer that is the same as or is derived from the polymer of the wall surface and 50 to 95 parts by weight of a volatile organic compound that is a solvent for both polymers; and (d) applying the plurality of microcapsules to the coated portion of the wall surface.

2. The method of claim 1, further comprising the step of curing the binder composition, whereby the plurality of microcapsules forms a surface layer on the coated portion of the wall surface.

* * * * *